US012656247B2

(12) United States Patent
Verdoold et al.

(10) Patent No.: US 12,656,247 B2
(45) Date of Patent: Jun. 16, 2026

(54) OPTICAL ABSORPTION SPECTROMETER

(71) Applicant: ams International AG, Jona (CH)

(72) Inventors: Remco Verdoold, Geldrop (NL);
Daniel Perez Calero, Adliswil (CH);
Ian Kilburn, Langnau am Albis (CH);
Erik Jan Lous, Veldhoven (NL);
Giuliano Manzi, Gratwein-Straßengel
(AT)

(73) Assignee: AMS INTERNATIONAL AG, Jona
(CH)

( * ) Notice: Subject to any disclaimer, the term of this
patent is extended or adjusted under 35
U.S.C. 154(b) by 0 days.

(21) Appl. No.: 17/926,857

(22) PCT Filed: May 19, 2021

(86) PCT No.: PCT/EP2021/063276
§ 371 (c)(1),
(2) Date: Nov. 21, 2022

(87) PCT Pub. No.: WO2021/239536
PCT Pub. Date: Dec. 2, 2021

(65) Prior Publication Data
US 2023/0236115 A1 Jul. 27, 2023

(30) Foreign Application Priority Data

May 28, 2020 (GB) .................................... 2007958
Dec. 14, 2020 (GB) .................................... 2019658

(51) Int. Cl.
*G01N 21/31* (2006.01)
(52) U.S. Cl.
CPC ..... *G01N 21/31* (2013.01); *G01N 2201/0634*
(2013.01); *G01N 2201/0636* (2013.01)

(58) Field of Classification Search
CPC .... G01N 21/31; G01N 21/255; G01N 21/031;
G01N 2201/0634; G01N 2201/0636;
G01N 2201/0346; G01N 2021/0346
See application file for complete search history.

(56) References Cited

U.S. PATENT DOCUMENTS 3,437,954 A 4/1969 Herriott et al.
6,030,883 A 2/2000 Nishimoto et al.
(Continued)

FOREIGN PATENT DOCUMENTS

CN 101677766 A 3/2010
CN 103221793 A 7/2013
(Continued)

OTHER PUBLICATIONS

International Preliminary Report on Patentability in corresponding
International Application No. PCT/EP2021/063276 mailed on Nov.
17, 2022, 13 pages.
(Continued)

*Primary Examiner* — Tarifur R Chowdhury
*Assistant Examiner* — Kemaya Nguyen
(74) *Attorney, Agent, or Firm* — MH2 Technology Law
Group LLP

(57) ABSTRACT

An optical absorbance spectrometer including a sample
housing configured to hold a sample, a light source config-
ured to emit broadband light into the sample housing, one or
more reflectors configured to reflect the light such that the
light passes through a sample holding volume of the sample
housing multiple times, and a sensor arranged to receive the
light from the sample housing, after the reflections. The
sensor comprises a plurality of detectors configured to detect
the intensity of the received light at multiple different
wavelengths.

17 Claims, 7 Drawing Sheets

(56)                    References Cited

U.S. PATENT DOCUMENTS

| | | | |
|---|---|---|---|
| 6,147,350 | A | 11/2000 | Beecroft et al. |
| 9,052,232 | B2 * | 6/2015 | Smith .................. G01J 3/0291 |
| 9,851,250 | B1 | 12/2017 | Emadi et al. |
| 12,235,207 | B2 * | 2/2025 | Lancuba .............. G01N 21/031 |
| 2010/0252737 | A1 * | 10/2010 | Fournel ............. G01N 21/8507 |
| | | | 250/338.4 |
| 2011/0233406 | A1 | 9/2011 | Majewski et al. |
| 2011/0236265 | A1 | 9/2011 | Hasui et al. |
| 2013/0003045 | A1 | 1/2013 | Wilkins |
| 2013/0270429 | A1 | 10/2013 | Bilenko et al. |
| 2016/0076997 | A1 * | 3/2016 | Koerner ............... A61B 5/0086 |
| | | | 250/339.01 |
| 2016/0202175 | A1 * | 7/2016 | Sawyers ................ G02B 17/04 |
| | | | 356/402 |
| 2018/0024040 | A1 | 1/2018 | Yan et al. |
| 2018/0164268 | A1 * | 6/2018 | Ben-Adert ............. G01N 21/31 |
| 2018/0180588 | A1 | 6/2018 | Robinson |
| 2018/0252651 | A1 | 9/2018 | Harbers et al. |

FOREIGN PATENT DOCUMENTS

| | | |
|---|---|---|
| CN | 108226038 A | 6/2018 |
| CN | 209446461 U | 9/2019 |
| JP | H08193946 A | 7/1996 |
| JP | 2005337875 A | 12/2005 |
| WO | 01/13091 A2 | 2/2001 |
| WO | 03/087786 A1 | 10/2003 |
| WO | 2008110927 A2 | 9/2008 |
| WO | 2011126476 A1 | 10/2011 |
| WO | 2012123124 A1 | 9/2012 |
| WO | WO-2014049358 A1 * | 4/2014 .............. H01S 3/08 |

OTHER PUBLICATIONS

Witte, Thomas (EP Authorized Officer), International Search Report and Written Opinion in corresponding International Application No. PCT/EP2021/063276 mailed on Sep. 30, 2021, 19 pages.

Chinese Office Action issued in corresponding Chinese Patent Application No. 202180036170.3, dated Nov. 25, 2024, with English language translation, 27 pages.

Chinese Office Action Issued In Corresponding Chinese Patent Application No. 2021800361703 Dated Jul. 21, 2025, with English Language Translation, 17 pages.

Chinese Office Action Issued In Corresponding Chinese Patent Application No. 2021800361703 Dated Dec. 2, 2025, with English Language Translation, 17 pages.

Chinese Office Action issued in corresponding Chinese Patent Application No. 202180036170.3, dated Jan. 30, 2026, with English Language Translation, 22 pages.

German Search Report issued in corresponding German Patent Application No. 2007958.8 dated Nov. 27, 2020, 5 pages.

* cited by examiner wavelength [nm]

OPTICAL ABSORPTION SPECTROMETER

CROSS-REFERENCE TO RELATED APPLICATIONS

The present application is the national stage entry of International Patent Application No. PCT/EP2021/063276, filed on May 19, 2021, and published as WO 2021/239536 A1 on Dec. 2, 2021, which claims the priority to Great Britain Application No. 2007958.8, filed on May 28, 2020, and Great Britain Application No. 2019658.0, filed on Dec. 14, 2020, all of which are incorporated by reference herein in their entireties.

TECHNICAL FIELD

The present disclosure is in the field of optical absorption spectrometry.

BACKGROUND

Optical absorption spectrometry is a well-established analysis technique. Amongst other uses, it is used to analyse samples taken from patients, such as blood, urine or other bodily fluid. It is also used for example in environmental water quality and chemical laboratory analysis. The molecular absorption of a sample is measured over a known optical path length through a sample. The molecular absorption is determined by the atomic structure and their bonds that make up the molecules in the sample, and different molecules will have absorption maximums at different wavelengths. An optical absorption spectrometer may be used to identify molecules in a sample by looking for wavelengths at which absorption is at a maximum (according to Beers' Law).

In a conventional optical absorption spectrometer, a sample of at least 50 µl, but typically well over 100 µl is placed into a cuvette. A beam of light from a white light source is passed through a monochromator. In this context the term "white light source" may be interpreted as meaning a source which emits light across all desired wavelengths (e.g. some ultraviolet, all visible and some infrared wavelengths). The monochromator coverts the light into a beam with a desired wavelength, and steps the beam through a range of wavelengths (e.g. in steps of 1 nm). The beam of light output from the monochromator is directed through the sample in the cuvette. The beam of light travels over a distance of 10 mm from one side of the cuvette to the other (10 mm may be considered to be a standard path length for the beam in absorption spectrometry). A photodiode (e.g. an avalanche photodiode or a photomultiplier tube) is used to detect light which has passed through the sample in the cuvette. This provides a record of light absorption as a function of wavelength. From this molecules in the sample can be identified.

A disadvantage of conventional optical absorption spectrometers is that they are complex and expensive. In addition, in some instances it may be difficult to obtain a sample with sufficiently large volume to be used in a conventional optical absorption spectrometer.

It is therefore an aim of the present disclosure to address one or more of the problems above or at least to provide a useful alternative.

SUMMARY

In general terms, this disclosure proposes to overcome the above problems by providing an optical absorption spectrometer in which a broadband light source emits a beam of light into a sample in a sample housing, reflectors reflect the beam of light through the sample multiple times, and a sensor detects the intensity of light incident on the sensor at multiple different wavelengths.

According to a first aspect of the invention there is provided an optical absorbance spectrometer comprising a sample housing configured to hold a sample, a light source configured to emit broadband light into the sample housing, one or more reflectors configured to reflect the light such that the light passes through a sample holding volume of the sample housing multiple times, and a sensor arranged to receive the light from the sample housing, after the reflections; wherein the sensor comprises a plurality of detectors configured to detect the intensity of the received light at multiple different wavelengths.

The disclosed optical absorption spectrometer is advantageous because the multiple passes of the beam of light through the sample allow a smaller sample to be used than would otherwise be the case. For example, a sample of 1-2 µl may be used instead of a sample of 50 µl. This is important because it allows for example a pinprick of blood to be analysed (a cannula of blood might otherwise be needed). In addition, if some preparation of the sample is needed such as filtration or chemical conversion, the preparation is faster and more efficient when the sample volume is small.

A further advantage of the disclosed optical absorption spectrometer is that it may be constructed using lower cost components, and may be less complex, than a conventional optical absorption spectrometer. This may allow the optical absorption spectrometer to be used outside of a clinical laboratory. This in turn may avoid the need to send a sample away to a laboratory for analysis. Instead, the disclosed optical absorption spectrometer may be used for example by a doctor in a hospital, or outside of a clinical setting (e.g. by a user in their home).

The light source may be configured to provide a beam of light. The reflectors may be configured to direct the beam of light through the sample holding volume multiple times.

The sample holding volume may be elongate. Reflectors may be provided on opposite sides of the sample housing.

The light source and the reflectors may be configured such that the beam of light crosses the sample holding volume multiple times as it propagates along the sample holding volume.

At least one of the reflectors may be concave.

The reflectors may be zigzags.

The light source may be configured such that the beam of light enters the sample holding volume at a non-normal angle through a wall of the sample holding volume.

The light source may comprise an aperture configured to convert diverging light from the light source into the beam of light.

The optical absorbance spectrometer may further comprise beam collecting optics configured to receive the beam of light that leaves the sample holding volume, and to increase a cross-sectional area of the beam of light before the beam of light is incident upon the sensor.

The beam collecting optics may be integrally formed with the sample housing.

The beam collecting optics may comprise a prism with a curved reflecting surface and a lens.

An area on a side of the sample housing may be not reflective in order to allow the beam of light to enter the sample holding volume. An area on a side of the sample housing may be not reflective in order to allow the beam of light to leave the sample holding volume.

The sample holding volume may be elongate. Reflectors may be provided at opposite ends of the sample housing.

One of the reflectors may be partially transmissive such that when the beam of light is incident upon the reflector a portion of the light beam passes through the reflector to the sensor.

At least one of the reflectors may be concave.

The sample holding volume may have a volume of less than 10 μl.

The detectors may be photodiodes over which filters for different wavelengths may be provided. The detectors may be single photon avalanche photodiodes (SPADs) over which filters for different wavelengths may be provided.

The sample holding volume may be spherical with a reflective surface.

According to a second aspect of the invention there is provided an optical absorbance spectrometry method comprising providing a sample in a sample housing, directing a beam of broadband light into the sample housing, using one or more reflectors to reflect the beam of light such that the beam of light passes through the sample multiple times, and detecting the intensity of the beam of light at multiple different wavelengths after the beam of light has exited the sample housing.

The beam of light may be modulated.

According to a third aspect of the invention there is provided a sample housing comprising a sample receiving volume, one or more reflectors provided around at least part of the sample receiving volume, and a sample receiving opening.

The one or more reflectors may be formed on a wall or walls of the sample housing.

At least one of the reflectors may include a non-reflective area configured to allow a beam of light to enter the sample housing.

According to a fourth aspect of the invention there is provide an optical absorbance spectrometer comprising a sample housing comprising an elongate channel which includes a plurality of bends, a light source configured to emit light into the elongate channel, and a sensor configured to receive the light from the elongate channel.

Surfaces of the elongate channel may be reflective.

At least some of the bends of the elongate channel may turn the direction of the channel through substantially 180 degrees.

The elongate channel may comprise three or more bends.

The elongate channel may be provided with a first opening and a second opening.

The first opening may be adjacent to one end of the elongate channel. The second opening may be adjacent to an opposite end of the elongate channel.

The light source and the sensor may be bonded to the sample housing.

The elongate channel may be formed at least partially as a recess in a block.

The sample housing may further comprise a lid which is fitted to the block in order to cover the recess.

The light source may be configured to emit broadband light.

The sensor may comprise a plurality of detectors configured to detect the intensity of the received light at multiple different wavelengths.

According to a fifth aspect of the invention there is provided a sample housing comprising an elongate channel which includes a plurality of bends, a first opening adjacent to one end of the elongate channel and a second opening adjacent to an opposite end of the elongate channel.

Sides of the elongate channel may be reflective.

At least some of the bends of the elongate channel may turn the direction of the channel through substantially 180 degrees.

Features of different aspects of the invention may be combined together.

BRIEF DESCRIPTION OF THE DRAWINGS

These and other aspects of the present disclosure will now be described by way of example only, with reference to the accompanying drawings, in which.

DETAILED DESCRIPTION

As described above, the present disclosure provides an optical absorption spectrometer in which reflectors reflect a beam of light through the sample multiple times. This advantageously increases the amount of light that is absorbed by the sample.

Figure 1A:
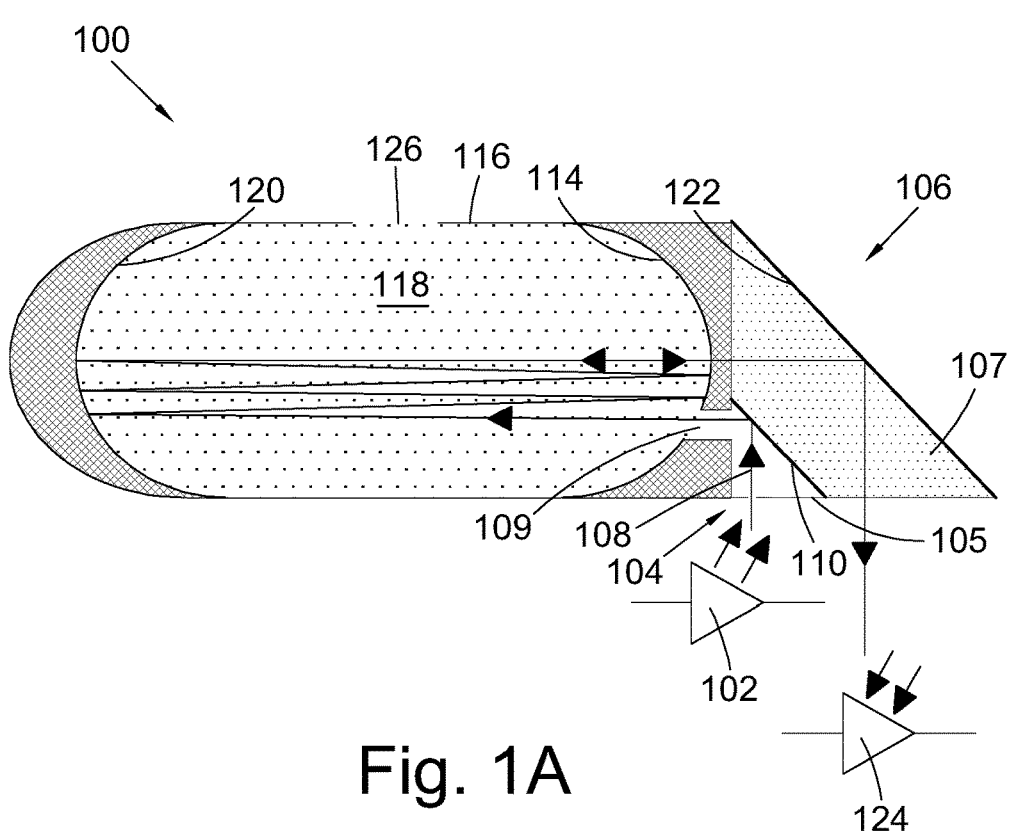
FIG. 1A is a schematic cross-sectional view of an optical absorption spectrometer according to an embodiment of the disclosure.

FIG. 1A schematically depicts in cross-section an optical absorption spectrometer 100 according to an embodiment of the invention. The absorption spectrometer 100 comprises a light source 102, coupling optics 106, a sample housing 116, a first curved mirror 114 and a second curved mirror 120. In some embodiments the first mirror 114 may be flat rather than curved (the second mirror 120 should still be curved). The first curved mirror 114 is partially transmissive (e.g. with a reflectivity of 95%).

The light source 102 may for example be a broadband LED (e.g. emitting light in a range from around 450 nm to around 850 nm). Other light sources may be used, which may for example emit light over a wavelength range of at least 300 nm (or at least 400 nm).

The coupling optics 106 comprises an aperture 104 located in a wall 105, and a mirror 110. The aperture 104 is spaced apart from the light source 102, and this has the effect of converting the light emitted by the light source 102 from strongly diverging light to a relatively collimated beam of light 108. After passing through the aperture 104 the beam of light 108 is reflected by the mirror 110 which forms part of the coupling optics 106. The mirror 110, which may be referred to as the first beam steering mirror, is arranged to reflect the beam of light 108 towards the first curved mirror 114. The first beam steering mirror 110 may for example be provided at an angle of 45° relative to the beam of light 108 received through the aperture 104.

After reflection by the first beam steering mirror 110, the beam of light 108 is incident upon the first curved mirror 114. A non-reflective area 109 is provided on the first curved mirror 114, through which the beam of light 108 passes into the sample housing 116. The position of the aperture 104 is selected, together with the angle of the first beam steering mirror 110 such that the beam of light 108 passes through the non-reflective area 109. The aperture position and the beam steering mirror angle are also selected such that the beam of light propagates through the sample housing 116 with a desired direction. The direction may be selected such that the beam of light 108 passes through the centre of the sample housing 116 (e.g. after one or more reflections from the mirrors 114, 120).

In use, a sample 118 is held in the sample housing 116. The beam of light 108 travels through the sample housing 116, and the sample 118, to an opposite end of the sample housing where it is incident upon the second curved mirror 120. The second curved mirror 120 is fully reflective (e.g. has a reflectivity of 100%). The beam of light 108 is reflected from the second curved mirror 120 and travels back through the sample housing 116 (and sample 118) to the first curved mirror 114.

Because the first curved mirror 114 has a reflectivity of 95%, 5% of the light beam 108 passes through the first curved mirror, with the remaining 95% being reflected. The 5% of the beam 108 which passes through the first curved mirror 114 enters the coupling optics 106 and is reflected by a mirror 122 of the coupling optics 106. This mirror 122 may be referred to as a second beam steering mirror of the coupling optics. The beam of light is reflected from the mirror 122 towards a sensor 124. The sensor 124 is described in more detail further below. The second beam steering mirror 114 may for example be provided at an angle of 45° relative to the beam of light 108 received through the first curved mirror 114.

The coupling optics 106 may for example comprise a block 107 formed from plastic, glass, quartz or other material which is transmissive to the light emitted by the light source 102. The first and second beam steering mirrors 110, 114 may be formed by provided a reflective layer upon flat surfaces of the block 107. The wall 105 in which the aperture 104 is provided may extend from the block 107 and may be formed integrally with the block. The first curved mirror 114 may be provided with a flat rear surface which engages with a corresponding flat surface of the block 107 (other alternative connections between the first curved mirror 114 and the block 107 may be provided).

The 95% of the light beam 108 which is reflected from the first curved mirror 114 again passes through the sample 118, is reflected from the second curved mirror 120 and passes through the sample again to the incident again upon the first curved mirror 114. Again, 5% of the light beam passes through the first curved mirror 114 and is incident upon the sensor 124. Again, 95% of the light beam is reflected. This occurs multiple times. After around 20 passes, on average all of the light that entered the sample housing 116 has been transmitted to the sensor 124. The number of passes may be different (e.g. more than around 20), but this does not change the way in which the embodiment functions.

Because the light beam 108 has passed through the sample housing 116, and the sample 118, multiple times this means that the length of the sample housing can be considerably reduced compared with a conventional sample housing of a conventional absorption spectrometer (through which the beam of light 108 only passes once). In a conventional sample housing (cuvette) the standard length along which a light beam travels from one end to the other end during absorption spectroscopy is 10 mm. An equivalent path length through the sample 118 in the embodiment of the invention may be achieved with a much shorter sample housing 116 due to the number of passes of the beam of light through the sample. This may allow the sample housing for example to have a length of 0.5 mm. This allows the volume of a sample needed to perform absorbance spectroscopy to be reduced significantly. This is advantageous because a measurement with the same sensitivity may obtained using a much smaller sample. For example, a sample obtained using a pinprick (also referred to as a finger-stick draw) may be used. This is preferable for a user, compared with obtaining a larger sample for example by drawing blood into a cannula. The user may be able to perform the pinprick themselves.

The reflectivity of the first curved mirror 114 will determine the number of times that the beam of light 108 passes through the sample 118. If it is desired to have a lower number of passes through the sample then the reflectivity is reduced, and if it is desired to have a higher number of passes through the sample then the reflectivity is increased.

The intensity of light incident at the sensor 124 will depend upon the intensity of light emitted by the source 102 and on the absorbance of the sample 118. As is explained further below, a different intensity of light may be seen at different wavelengths (due to the sample 118 having different absorbance at different wavelengths).

The curvatures of the first and second curved mirrors 114, 120 is selected such that the beam of light 108 travels along substantially the same path through the sample 118 multiple times. The curvatures may be selected such that the beam of light 108 travels between a centre of the first curved mirror 114 and a centre of the second curved mirror 120. This may correspond with a centre of the sample housing 116. Although the beam of light 108 enters the sample housing 116 away from the centre of the first mirror 114, the curvature of the mirrors 114, 120 guides the beam of light to the centres of the mirrors.

In the depicted embodiment, the sample housing has curved ends. The first and second curved mirrors 114, 120 may be formed by providing reflective material on the curved ends. The first reflector 114 may comprise a multi-layer structure configured to provide the desired percentage reflectivity. The reflectivity may be provided over a desired range of wavelengths, e.g. from ultraviolet through visible to infrared. The coupling optics 106 may be secured to the first curved mirror 114 for example using adhesive.

The light source 102 and the sensor 124 may be provided on a common semiconductor substrate, or may be provided on different semiconductor substrates. The light source 102 and the sensor 124 may be secured to the coupling optics 106, for example using adhesive. A mechanical engagement mechanism may be used to ensure alignment, such as a combination of protrusions and recesses which receive the protrusions.

A sample receiving opening 126 is provided in the sample housing 116. The volume of the sample housing 116 may for example be 5 μl or less, and may for example be less than 10 μl. The volume of the sample housing 116 may for example be 0.1 μl or more, and may for example be 1 μl or more. A sample provided as a droplet at the opening 126 will be drawn into the sample housing by capillary action. The opening 126 may have a diameter which is similar to a syringe needle diameter, for example up to 2 mm, up to 1 mm or less than 1 mm.

Features of the above described embodiment such as volumes and sizes may also apply to other embodiments.

Figure 1B:
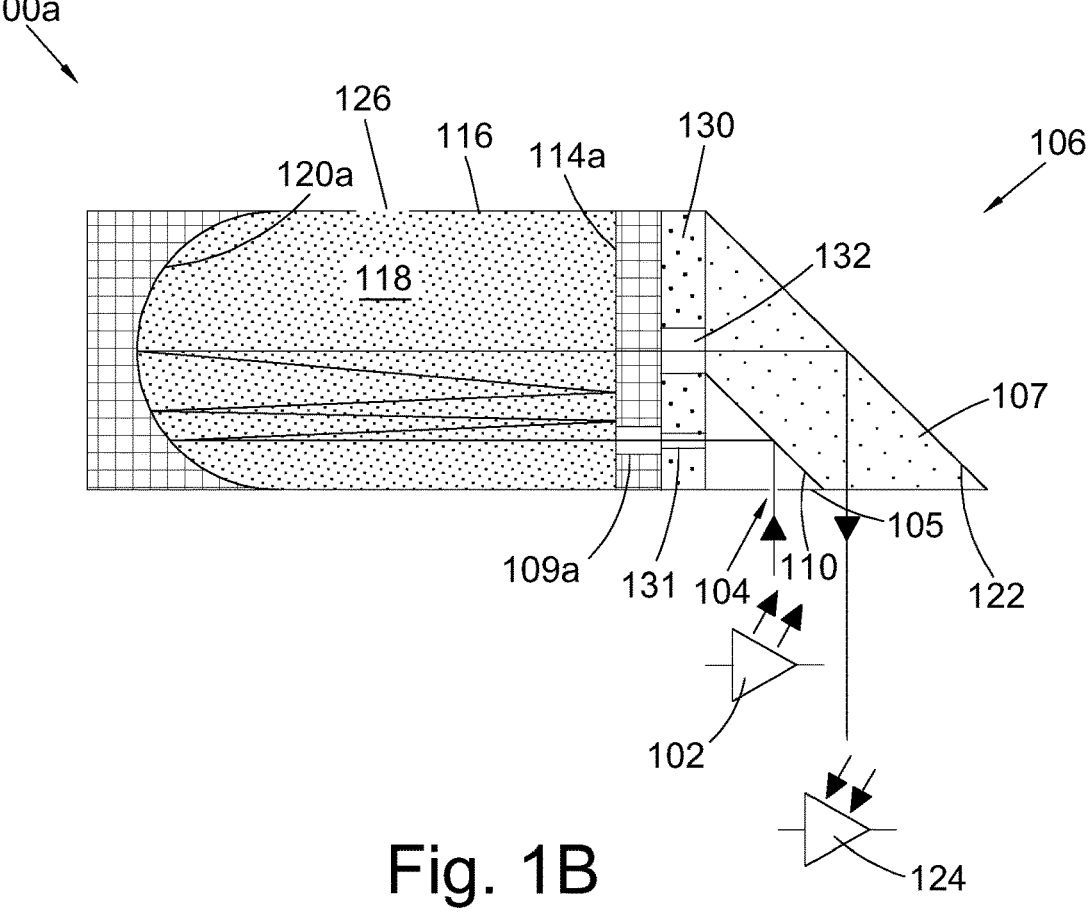
FIG. 1B is a schematic cross-sectional view of an optical absorption spectrometer according to a modified implementation of the embodiment of FIG. 1A.

FIG. 1B is a schematic cross-sectional view of an optical absorption spectrometer 100a according to a modified implementation of the embodiment of FIG. 1A. In the following description, features of the modified implementation which are the same as in FIG. 1A are not described again (only differences are described). The first reflector 114a is planar instead of being concave. The second reflector 120a is concave. The combination of a planar reflector 114 and a concave reflector 120a is sufficient to control the propagation of the light beam 108 through the sample housing 116 multiple times as schematically depicted. The second reflector 120a has a planar back surface instead of a curved back surface (this may be easier to manufacture).

A barrier 130, which may be referred to as a plate, is provided between the first reflector 114a and the block 107 (more generally, the barrier is between the first reflector and the coupling optics 106). The barrier has a first aperture 131 and a second aperture 132. The first aperture 131 is aligned with the non-reflective area 109a of the first reflector 114a, and allows the beam of light 108 to enter the sample housing 116. The second aperture 132 is aligned with a central axis (not depicted) which passes through the centre of the second reflector 120a. The second aperture 132 receives the proportion of the beam of light 108 which passes through the first reflector 114a, and allows that proportion of the beam of light to travel into the block 107. The second aperture 132 may be larger than the first aperture 131 because some divergence of the beam of light 108 may occur as the beam of light propagates back and forth in the sample housing 116. The barrier advantageously prevents unwanted light from passing into the sample housing 116 and prevents unwanted light from passing out of the sample housing to the sensor 124.

Figure 2A:
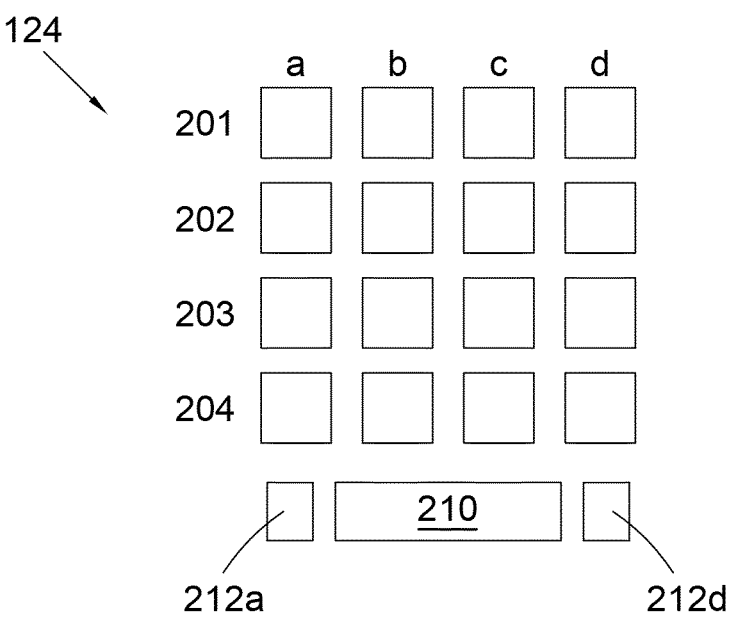
FIG. 2A is a schematic view from above of a sensor which may form part of the optical absorption spectrometer.

The sensor 124 is schematically depicted in FIG. 2a. In this embodiment the sensor comprises a 4×4 array of photodiodes. These are labelled in rows and columns 201a-d, 202a-d, 203a-d, 204a-d. Each photodiode of the array 4×4 is provided with a spectral filter which allows only light at a particular wavelength (or wavelength range) to pass onto that photodiode. Different spectral filters are indicated in FIG. 2a using differed forms of shading pattern. As may be seen from the shading patterns, in this example the same spectral filter is provided for pairs of photodiodes. The pairs are 201a and 204d, 201b and 204c, 201c and 204b, 201d and 204a, 202a and 203d, 202b and 203c, 202c and 203b, 202d and 203a. Consequently, there are eight different wavelengths being sensed by the 4×4 array. This arrangement advantageously allows some averaging of the signal obtained for each detected wavelength and provides an improved signal to noise ratio.

Figure 2B:
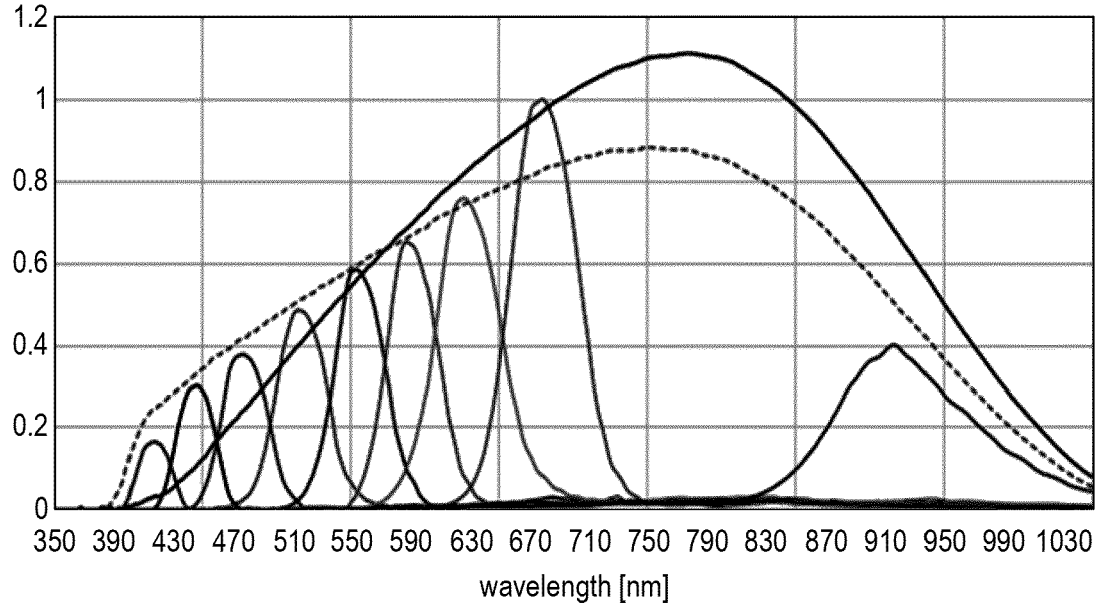
FIG. 2B is a graph which shows the response of the sensor of FIG. 2 to light at different wavelengths.

A larger photodiode 210 is provided at one end of the 4×4 array of the sensor 124. This larger photodiode is configured to detect near infrared light. Two photodiodes 212a,d are provided without a spectral filter. These may be used to detect light at all wavelengths which are incident upon the sensor 124. The light detected by the photodiodes 212a,d without the spectral filter may be used for example to correct for variations of the intensity of light output by the light source 102. A chart depicting the spectral responsivity of the sensor 124 is depicted as FIG. 2b. The chart depicts spectral response of the pairs of photodiodes relative to the most sensitive pair of photodiodes (the pair which detects at 670 nm) as a function of wavelength. The sensor may for example be an AS7341 sensor available from AMS of Premstaetten Austria.

In an alternative embodiment, not depicted, the light source may be located between the first and second reflectors. Where this is the case, the light source may be located outside of the sample housing 116, and one of the reflectors may be spaced away from the sample housing. This embodiment may be less preferred because it is more complicated to fabricate.

Figure 3A:
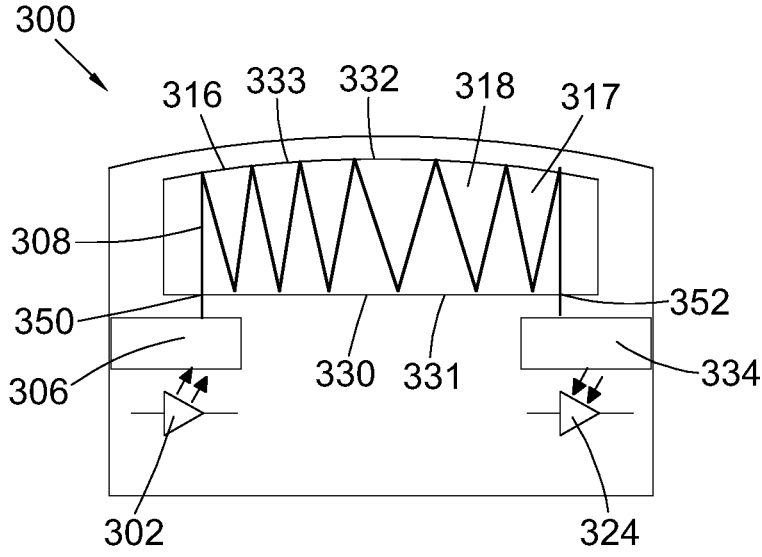
FIG. 3A is a schematic cross-sectional view of an optical absorption spectrometer according to an alternative embodiment of the disclosure.

An optical absorption spectrometer 300 according to an alternative embodiment of the invention is depicted in FIG. 3A. In this embodiment, instead of a light beam passing from end to end of a sample housing multiple times, a light beam passes from side to side of the sample housing as it progresses from one end of the sample housing to the other. An advantage of this arrangement is that, because the light beam does not pass multiple times through the same part of the sample, saturation effects which might occur in the sample are avoided or reduced. A further advantage is that providing fully reflective mirrors may be cheaper than providing one fully reflective and one 95% reflective mirror (providing a 95% reflective mirror may be relatively costly because it may be difficult to ensure that the right percentage of reflectivity is provided—it may for example require a multilayer structure).

In FIG. 3A, the optical absorption spectrometer 300 is schematically depicted in cross-section. A light source 302 is configured to emit broadband radiation. The light source may for example be a broadband LED (e.g. as described further above). Coupling optics 306 are configured to couple light from the light source 302 into a sample housing 316 of the spectrometer 300. The coupling optics 306 are described further below. The sample housing 316 is generally elongate in form (i.e. longer than it is wide). A mirror 330 is provided on one side of the sample housing 316, and a mirror 332 is provided on an opposite side of the sample housing. The mirrors 330, 332 may be formed by providing reflective layers on the sides the sample housing 316. In this embodiment one side 331 of the sample housing 316 has a flat mirror 330 and the other side 333 of the sample housing has a concave mirror 332 (when viewed from inside the sample housing).

A sample 318 is provided in a sample holding volume 317 of the sample housing 316. The sample 316 includes a sample receiving opening (not depicted) via which a sample may be introduced into the sample housing 316. The sample opening may be provided in a non-mirrored side of the housing 316.

The coupling optics 306 forms a beam of light 308 from the light emitted by the light source 302. This beam of light 308 enters the sample housing 316 through a non-reflective area 350 on the flat side 331 of the sample housing 316.

As is schematically depicted, the beam of light 308 travels across the sample housing 316 (and through the sample 318)

to the concave side 333. The beam of light 308 is then reflected by the mirror 332 back towards the flat side 331, but is reflected at an angle such that it travels part way along the sample housing 316 as it travels across the sample housing. Since the beam of light 308 is propagating at an angle, it is reflected by the mirror 330 on the flat side 331 at a corresponding angle and propagates back to the concave mirror 332. In this way the beam of light 308 propagates along the sample housing 316. The angle of reflection increases each time the beam of light 308 is reflected from the concave mirror, 332 due to the concave mirrors shape, until the beam of light reaches the middle of the concave mirror. Following this, the angle of reflection decreases until a final reflection of the beam of light from the concave mirror 332.

Following the final reflection from the concave mirror 332, the beam of light 308 travels to the flat side 331 of the sample housing 316. The beam of light 308 may be substantially perpendicular to the flat side 331 of the sample housing 316. The beam of light 308 passes through a non-reflective exit area 352 on the flat side 331 of the sample housing 316 and into beam collecting optics 334. The beam collecting optics 334 are described further below. The beam of light 308 is output from the beam collecting optics 334 onto a sensor 324. The sensor 324 may be configured to detect the intensity of the beam of light 308 at wavelengths of interest. In one example the sensor 324 may be as depicted in FIG. 2.

In this embodiment the beam of light 308 passes across the sample housing 316 (and through the sample 318) fourteen times (in other embodiments a different number of passes may take place) Due to the multiple reflections of the beam of light 308 across the sample housing 316, a smaller sample than a conventional sample may be used without a corresponding reduction in the sensitivity of the absorption spectroscopy measurement which is provided. For example, a path length for the beam of light 308 may be provided which is the same as or greater than a 10 mm path length which may be provided in a conventional optical absorption spectrometer. The sample housing 316 may have a smaller volume than a cuvette as used in a conventional absorption spectrometer. For example the sample housing 316 may have a volume of less than 10 µl, may have volume of 5 µl or less, and may have a volume of 1-2 µl. These volumes may apply to other embodiments.

Figure 3B:
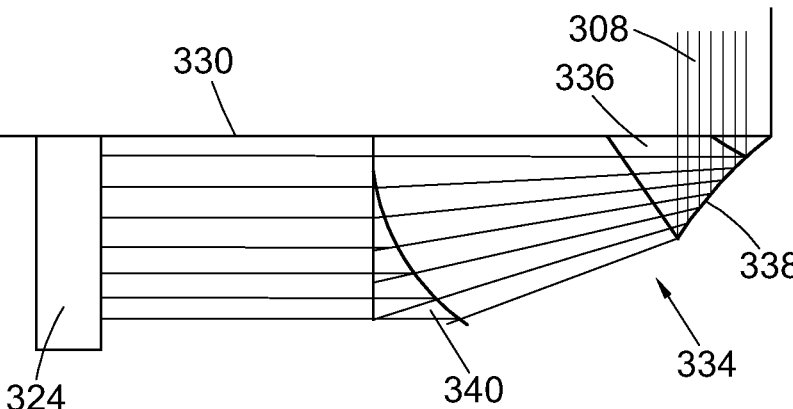
FIG. 3B is a schematic cross-sectional view of beam collecting optics of the optical absorption spectrometer of FIG. 3A.

The beam collecting optics 334 are schematically depicted in FIG. 3B, together with the sensor 324 and a corner of the sample housing 316. The beam collecting optics 334 comprises a prism 336 provided with a convex reflective surface 338 (as seen from the point of view of the beam of light 308). A lens 340 is provided adjacent to the prism 336. The lens has a concave surface facing towards the prism 336 and a planar surface facing away from the prism. The sensor 324 is located adjacent to the lens 340. The lens 340 may be referred to as a projector because it is configured to convert diverging rays into parallel rays.

The beam collecting optics 334 may be integrally formed with the sample housing 316. These may all for example be formed from plastic which is transparent at wavelength of interest (e.g. for visible light), from glass, or from some other suitable transparent material.

Part of the mirror 330 on the flat side 331 of the sample housing 316 is shown. The mirror 330, which may be referred to as a reflective surface (as may other mirrors), extends as far as the lens 340. The mirror 330 extends over the location at which the sensor 324 is provided. This prevents light from leaking directly out of the sample housing 316 and onto the detector 324.

The beam of light 308 is depicted as rays in FIG. 3B in order to illustrate the operation of the beam collecting optics 334 and the lens 340. As is schematically shown by the rays, the beam of light is relatively narrow as it propagates along the sample housing 316. If the sensor 324 were provided at the point where the beam of light 308 exits the sample housing 316, the beam of light may not be sufficiently wide to properly illuminate the sensor 324. The beam collecting optics 308 addresses this issue. The convex reflective surface 338 causes the beam of light 308 to diverge. The lens 340 collects and collimates the diverging beam of light. In this way a beam of light 308a with an area sufficiently large to fully illuminate the sensor 324 is formed (although the intensity of the light may be reduced).

In other embodiments, the spectral sensor may be used without the beam collecting optics and lens.

The beam collecting optics 334 are simple in their configuration, and may be easy to form. There is no need for the beam collecting optics 334 to be of a high quality comparable with the quality that would be needed to form an image on the sensor 324. Instead, it is merely sufficient to direct the beam of light 308 onto the sensor 324 with a desired area.

Figures 3C, 4:
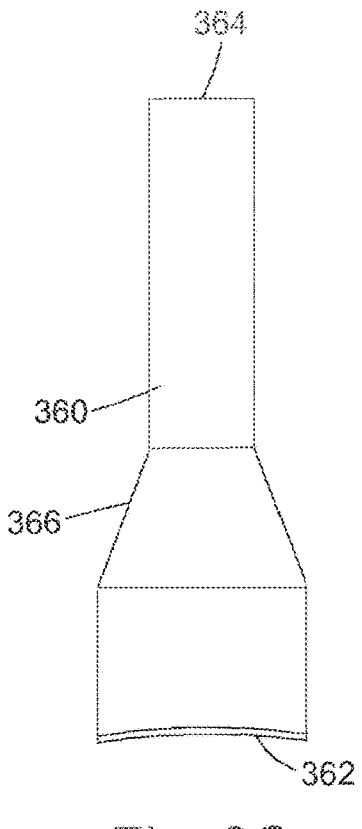
FIG. 3C is a schematic cross-sectional view of beam delivery optics of the optical absorption spectrometer of FIG. 3A.
FIG. 4 is a schematic cross-sectional view of an optical absorption spectrometer according to a further alternative embodiment of the disclosure.

FIG. 3C schematically depicts in cross-section the beam coupling optics 306. The beam coupling optics comprises a light pipe 360 which is configured to collect light at an entrance end 362 and to emit collimated light from an exit end 364. As depicted the light pipe 360 may be concave at the entrance end and may include a tapered portion 366. The light source 302 (see FIG. 3A) may be an LED which includes a lens that collects and directs light emitted from the LED. This arrangement may help to ensure that more light is collected by the light pipe 360 than would otherwise be the case.

The length of the sample housing 316 may for example be more than twice the width of the sample housing. The length of the sample housing 316 may for example be three times the width of the sample housing or more. In an embodiment, the sample housing may have a length of around 4 mm. In an embodiment, the sample housing may have a width of around 1.3 mm in at least one direction.

FIG. 4 schematically depicts in cross-section a further alternative embodiment of the invention. In this embodiment, an absorption spectrometer 400 comprises a sample housing 416 having two facing sides provided with mirrored zigzags 430, 432 (which may be referred to as prisms). A sample holding volume 417 of the sample housing 416 is elongate. The mirrored zigzags 430, 432 guide a light beam 408 from a light source 402, along the sample housing 416 and to a sensor 424. The light source 402, sensor 424, and other features of this embodiment may be as described further above in relation to other embodiments.

The sample housing may be provided with thicker walls 419 in order to accommodate the mirrored zigzags 420, 432. Surfaces of the sample housing 416 which surround the sample holding volume 417 are planar (to avoid causing unwanted deviations of the light beam 408). The light source 402 and sensor 424 are embedded in the walls 419 of the sample housing. The light source 402 may be provided with beam coupling optics, including an aperture (e.g. as described further above). Alternatively, just an aperture may be provided (in order to provide a reasonably collimated light beam 408). Similarly, the sensor 424 may be provided with beam collecting optics (e.g. as described further above). Alternatively, the sensor 424 may be arranged such that the light beam 408 is incident directly upon the sensor.

The embodiment of FIG. 4 may operate in the same way as the embodiment depicted in FIG. 3. Advantages described above in connection with FIG. 3 may also apply to this embodiment. For example, beam coupling optics and/or beam collecting optics may be integrally formed with the sample housing 416. Other advantages are not repeated here.

Figure 5:
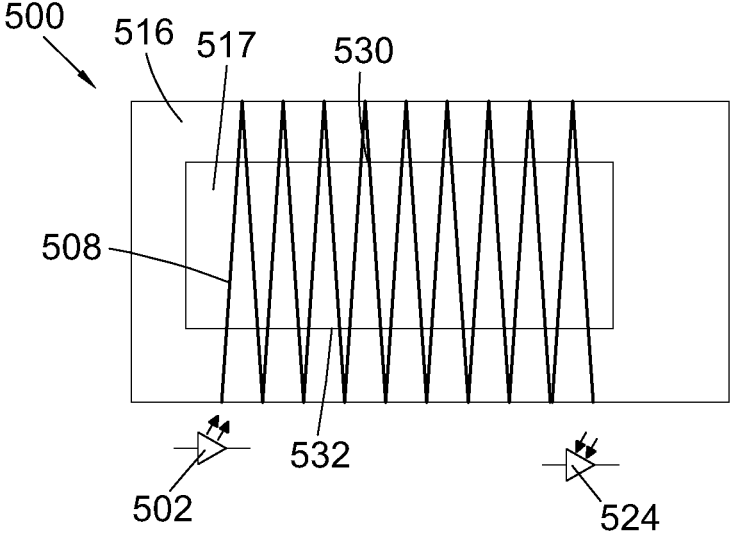
FIG. 5 is a schematic cross-sectional view of an optical absorption spectrometer according to a still further alternative embodiment of the disclosure.

FIG. 5 schematically depicts in cross-section a further alternative embodiment of the invention. In this embodiment, an absorption spectrometer 500 comprises a sample housing 516 having two facing mirrored flat sides 530, 532. A sample holding volume 517 of the sample housing 516 is elongate (and may have dimensions as described above for other embodiments). A light source 502 is configured to provide a beam of light 508 which is directed across the sample housing 516 at a non-normal angle relative to the mirrored flat sides 530, 532 of the sample housing. As a result, the beam of light 508 propagates along the sample housing 516 to an opposite end, where the beam of light is incident upon a sensor 524. The light source 502, sensor 524, and other features of this embodiment may be as described further above in relation to other embodiments.

The light source 502 may be provided with beam coupling optics, including an aperture (e.g. as described further above). Alternatively, just an aperture may be provided (in order to provide a reasonably collimated light beam 508). Similarly, the sensor 524 may be provided with beam collecting optics (e.g. as described further above). Alternatively, the sensor 524 may be arranged such that the light beam 508 is incident directly upon the sensor.

The embodiment of FIG. 5 may operate in the same way as the embodiments depicted in FIGS. 3 and 4. Advantages described above in connection with FIGS. 3 and 4 may also apply to this embodiment. For example, beam coupling optics and/or beam collecting optics may be integrally formed with the sample housing 516. Other advantages are not repeated here.

Figure 6:
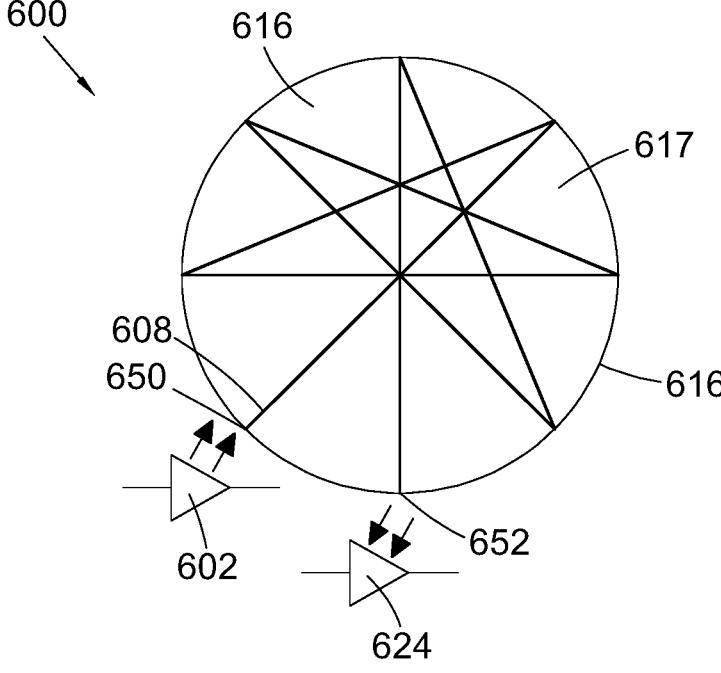
FIG. 6 is a schematic cross-sectional view of an optical absorption spectrometer according to a still further alternative embodiment of the disclosure.

A further embodiment of the invention is depicted in FIG. 6. In this embodiment, as shown generally at 600, a sample housing 616 is spherical. The spherical surface of the sample housing 616 is reflective. A sample receiving opening (not depicted) is provided to allow a sample 618 to be introduced into a sample holding volume 617 of the sample housing 616.

A light source 602 is configured to direct light 608 through a non-reflective entrance area 650 into the sample housing 616. Although the light 608 is depicted as a beam, the light may be diverging and may spread out within the sample holding volume 617. A sensor 624 is configured to receive light via a non-reflective exit area 652.

In this embodiment the light 608 is not guided along the sample holding volume 617. Instead, the light 608 is trapped within the sample holding volume 617 until it is incident at the exit area 652. The light may travel along a known average path length through the sample 618 before it is incident upon the sensor 624.

The volume of the sample holding volume may be the same as the volumes described above for other embodiments.

In an embodiment, the light source 602 may be as described above in connection with other embodiments (e.g. a broadband LED). In an embodiment, the sensor 624 may be as described above in connection with other embodiments (e.g. an array of photodiodes provided with different wavelength filters).

In another embodiment, the light source 602 may be fixed at a particular wavelength, and the sensor 624 may detect photons at any wavelength. This embodiment may be used for example to detect for a particular known molecule which absorbs at a particular wavelength. The sensor 624 may for example be a single photon avalanche photodiode.

In another embodiment, the light source 602 may be tuneable to desired wavelengths (e.g. may be tuneable LED or solid state laser), and the sensor 624 may detect photons at any wavelength. The sensor 624 may for example be a single photon avalanche photodiode.

Figure 7:
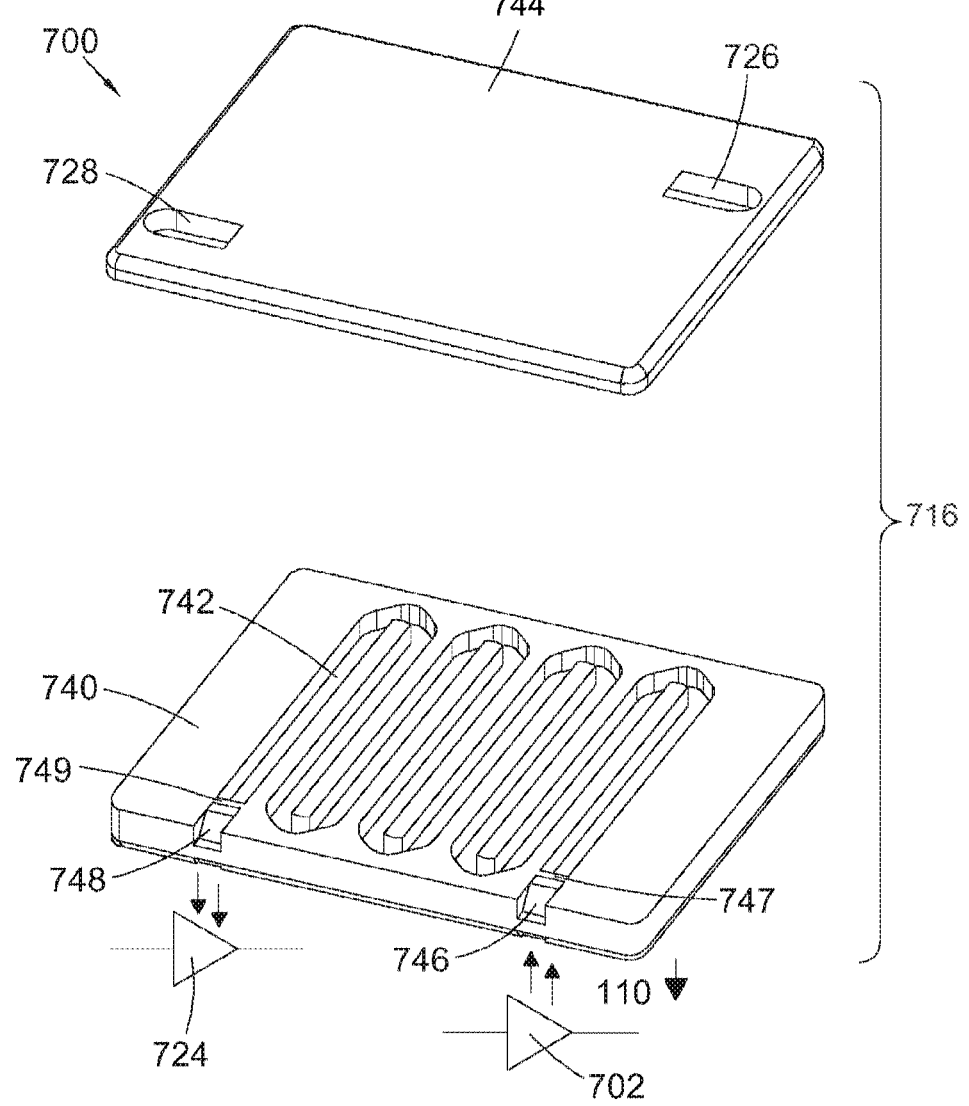
FIG. 7 depicts in exploded perspective view an optical absorbance spectrometer according to a still further alternative embodiment of the disclosure.

FIG. 7 depicts in exploded perspective view an optical absorbance spectrometer 700 which comprises a sample housing 716 formed in two parts. A first part of the sample housing 716 is a base 740 in which an elongate recess 742 is formed. The elongate recess 742 includes a plurality of bends (in this example seven bends). The second part is a lid 744 which is configured to be secured to the base 740. The lid 744 may for example be secured to the based using a lamination process, ultrasonic welding or using glue. The elongate recess 742 and the lid 744 cooperate to form an elongate channel 750 (see FIG. 8) in the sample housing 716.

A light source 702 (schematically depicted) is provided adjacent to one end of the elongate channel 750 formed by the elongate recess 742 and lid 744. The light source 702 is configured to emit light into the elongate channel 750. A sensor 724 (schematically depicted) is provided at an opposite end of the elongate channel 750. The sensor 724 is configured to receive light from the elongate channel 750. The light source 702 and the sensor 724 are provided beneath the base 740. A first mirror 746 is used to reflect light emitted by the light source 702 through a first window 747 and into the elongate channel 750. A second mirror 748 is used to receive light which passes out of a second 749 at an opposite end of the elongate channel 750 and to direct the light on to the sensor 724. The mirrors may be formed by providing reflective material on suitably oriented surfaces of the sample housing 716 (e.g. surfaces of the base 740). In other embodiments the mirrors may be omitted. The light source and/or sensor may be aligned with an end of the elongate channel 750.

Optionally, optics (e.g. one or more lenses) may be used to modify the light from the light source 702 before it enters the elongate channel 750. For example, one or more lenses may be used to collimate the beam of light from the light source 702. Optionally, optics may be used to modify the light before it is incident upon the sensor 724. For example, one or more lenses may be used to modify a diameter of the beam of light when it is incident upon the sensor to ensure that the light is incident across a sensing area of the sensor.

The base 740 and the lid 744 may for example be formed from glass. The glass may be opaque to minimize entry of ambient light into the elongate channel 750. Surfaces of the elongate channel 750 may be provided with reflective material (as explained below), which acts to minimize entry of ambient light into the elongate channel. This may be achieved by providing a reflective surface across the upper surface of the base 740 and the lower surface of the lid 744 such that when the base and lid are brought together the reflective surfaces face each other. In a different approach, reflective material may be provided on an outer surface of the sample housing 716. Where reflective material is used, the glass of the base 740 and lid 744 may be transparent without significant ambient light entering into the elongate channel 750.

The emitter 702 and sensor 724 may be silicon devices.

A reflective surface may be provided in the elongate recess 742. A reflective surface may be provided on the lid (e.g. portions of the lid 744 which cooperate with the elongate recess 742 to form the elongate channel 750). The reflective surfaces may for example be formed by a reflective material (e.g. any suitable reflective layer) to the elongate recess 742 and the lid 744. Making surfaces of the elongate channel 750 reflective is advantageous because it reduces the extent to which the intensity of the beam of light will reduce as it propagates along the elongate channel. It is desirable to maintain the intensity of the beam of light because this may allow a better signal to noise ratio to be provided by the sensor 724 (compared with the case if the beam of light was more attenuated). However, even without providing reflective surfaces in the elongate channel 750, the beam of light may nevertheless be guided along the elongate channel to the sensor 724 (albeit with more attenuation than if the reflective surfaces were present).

The elongate recess 742 as depicted has seven bends. However, the elongate recess may have a different number of bends. For example, the elongate recess may have three or more bends. The elongate recess 742 may comprise a plurality of straight portions which are connected by bends. The straight portions may for example be parallel to each other. Where this is the case, the bends may turn the direction of the channel through substantially 180 degrees.

The elongate recess may have some other shape. However, in general it is preferred for the elongate recess to have at least three bends, and preferably to include a plurality of portions which run adjacent to each other (instead of for example being a single straight elongate recess). This advantageously allows a maximum dimension of the sample housing 716 to be smaller than would otherwise be the case.

The elongate recess 742 may have flat side walls and a flat bottom surface (as depicted). The lid 744 may provide a flat upper surface for the elongate channel 750. The resulting generally rectangular shape may advantageously make it easier for light to propagate along the elongate channel 750 whilst remaining generally parallel to surfaces of the elongate channel. In addition, it may be easier to form the elongate recess 742 with flat sides walls and a flat bottom surface than to form it with other shapes. However, the elongate channel 750 may have any other suitable cross-sectional shape.

The elongate channel 750 may for example have a width of 0.3 mm. The elongate channel 750 may for example have a height of 0.2 mm. The length of each part of the elongate channel 750 between bends may be around 3.6 mm. In the depicted example, the elongate channel has eight lengths. Thus, the elongate channel has a volume of approximately 1.7 mm$^3$ (8×3.6 mm×0.2 mm×0.3 mm). This corresponds with a volume of around 1.7 μl.

The height of the elongate channel 750 may for example be less than 1 mm, e.g. less than 0.5 mm. The width of the elongate channel 750 may for example be less than 1 mm, e.g. less than 0.5 mm. The length of the elongate channel between bends may for example be less than 10 mm, e.g. less than 5 mm. The total length of the elongate channel may for example be less than 1 cm, e.g. less than 50 mm.

The volume of the elongate channel 750 may for example be less than 10 μl. The volume of the elongate channel 750 may for example by less than 5 μl. The volume of the elongate channel 750 may for example be between 1 and 2 μl.

The light source 702 and/or the sensor 724 may be bonded to the housing 716 (e.g. to the base 740). One way in which bonding of semiconductor devices such as the light source and sensor (which may be formed from silicon) may be bonded to a glass substrate is described in Kailin Yang, Hailong Yao, Tsung-Yi Ho, Kunze Xin, Yici Cai, "AARF:

Any-Angle Routing for Flow-Based Microfluidic Biochips", IEEE Transactions on Computer-Aided Design of Integrated Circuits and Systems•January 2018, which is hereby incorporated by reference.

The lid 744 is provided with a first opening 726 and a second opening 728. The first opening 726 is adjacent to one end of the elongate channel 750 (in this instance the end at which the light source 702 is provided). The first opening 726 may be used to deliver a sample into the elongate channel 750 The position of the first opening 726 does not precisely correspond with the beginning of the elongate channel. Providing the first opening 726 adjacent to one end of the elongate channel 750 may make it easier to deliver the sample into the elongate channel (compared with for example if the opening was in the middle of the elongate channel).

The second opening 728 is provided adjacent to an opposite end of the elongate channel 750 (in this case the end at which the sensor 724 is located). Although this opening 728 is positioned at the end of the elongate channel 750, it is not necessary for the opening to be provided at the end of the elongate channel 750. The second opening 728 is a venting hole, which allows air to leave the elongate channel 750 as the sample is delivered into the elongate channel. This is desirable due to the elongate shape of the channel (if a venting hole was not provided then trapped air might prevent the sample from properly entering the channel).

In the depicted embodiment the elongate recess 742 is provided in the base 740 and no recess is provided in the lid 744. However, in other embodiments an elongate recess may be formed in the lid as well as in the base (or only in the lid).

In an embodiment, the sample housing 716 may be formed using additive manufacturing. Where this is the case, a base and lid is not required. Instead, the elongate channel 750 may be provided in a single structure. Where this is the case, the reflective coating for the elongate channel may be provided for example by submersing the sample housing 716 in a liquid reflector and then removing it. The excess liquid reflector will drain out of the sample housing, leaving a layer of liquid reflector on surfaces of the elongate channel 750 which dries to form a reflector on surfaces of the elongate channel. Alternatively, total internal reflection within the elongate channel 750 may be relied upon for propagation of light (i.e. no reflective surface on the elongate channel). Where this is the case, the exterior of the sample housing 716 may be provided with a reflective coating.

Figure 8:
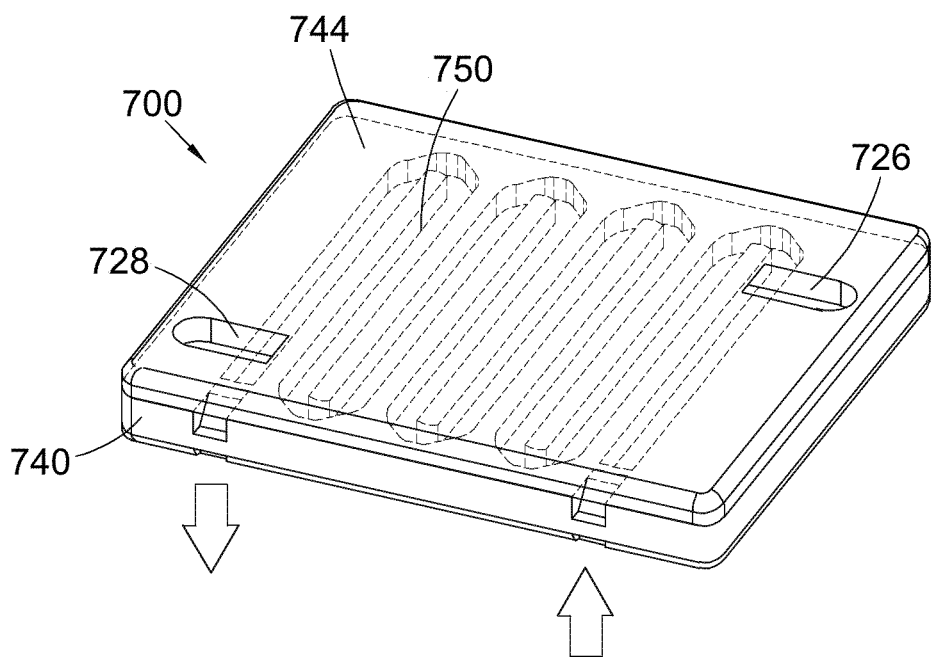
FIG. 8 depicts in perspective view the optical absorbance spectrometer of FIG. 7.

FIG. 8 is a perspective view of the optical absorbance spectrometer 700 which has been made partially transparent so that the elongate channel 750 formed by the recess 742 and lid 744 may be seen. Light entering and leaving the sample housing 716 of the optical absorbance spectrometer 700 is schematically depicted by arrows.

Figure 9:
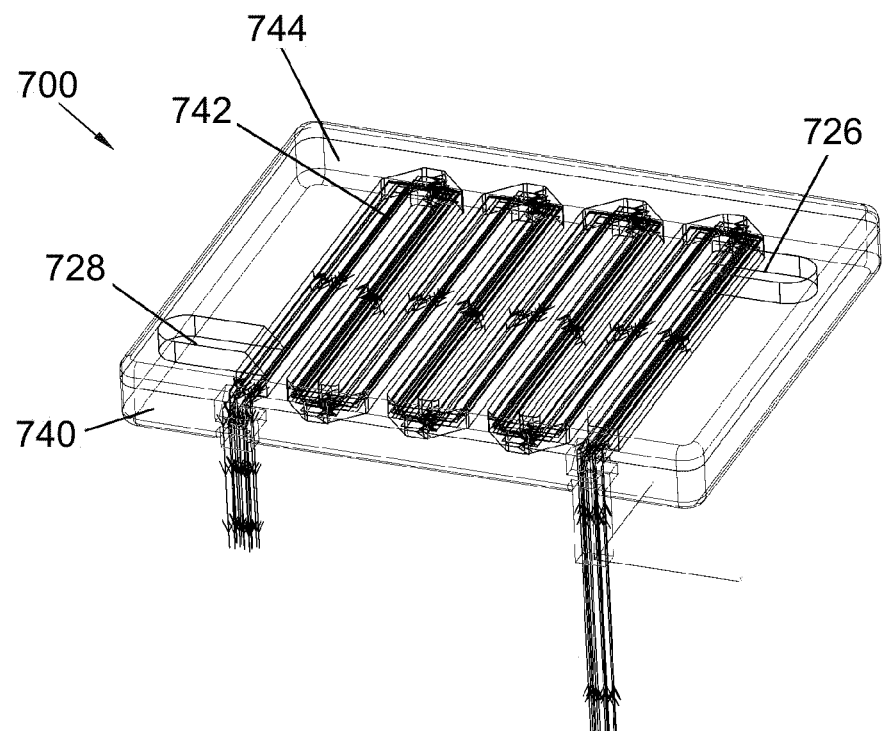
FIG. 9 depicts paths of rays of light through the optical absorbance spectrometer of FIGS. 7 and 8 as determined using modelling software.

FIG. 9 depicts the results of a model of the optical absorbance spectrometer 700 generated using optical modelling software. This shows how light, depicted as a plurality of rays, enters the elongate channel 750, propagates along the elongate channel (including reflections at bends of the elongate channel) and then leave the elongate channel.

As may be seen in FIG. 9, the size of the beam of light as it propagates along the elongate channel generally corresponds with the cross-sectional area of the elongate channel 750. As a result, the beam of light interacts with substantially all of the sample held in the sample housing 716. This is in contrast for example to prior art systems in which a beam of light passes through only a small proportion of a sample. Because the beam of light passes through substantially all of the sample held in the sample housing 716, the proportion of the sample through which the light passes is far higher than in a conventional arrangement. This means that the volume of sample which is needed in order to obtain a desired signal to noise ratio for a given measurement is significantly reduced (this may be desirable for biological samples which may be difficult to obtain). It also means that the volume of the elongate channel may be smaller than that of a conventional sample housing. Therefore, the size of the sample housing 716 may be smaller than is conventionally provided. For example, the sample housing may have a volume of less than one cubic centimeter. The sample housing 716 may for example have a maximum dimension of less than one centimeter. The sample housing may for example have a length of around 6 mm and may for example have a width of around 5 mm. As noted further above, a maximum dimension of the sample housing 716 is kept small by including multiple bends in the elongate channel.

The light source 702 may be configured to emit broadband light. The sensor may comprise a plurality of detectors configured to detect the intensity of received light at multiple different wavelengths.

Absorption spectroscopy may be performed by measuring light received at the sensor 724 when no sample is present, and then measuring light received at the sensor when a sample is present. This allows measurements to be calibrated for the performance of the light source 702 and the sensor 724.

The sample housing 716 may be disposable. The light source 702 and the sensor 724 may be provided in a base structure which is configured to receive the sample housing and align it with the light source an sensor (e.g. via a recess which has a shape that corresponds with the shape of the sample housing).

Features of the different embodiments may be combined together. For example, features of the embodiments described in connection with FIGS. 1 to 6 may be combined with the embodiment described in connection with FIGS. 7 to 9 (and vice versa).

The beam of light provided by the light source of embodiments of the invention may be continuous. The beam of light may be modulated, e.g. using an acousto-optic modulator or by modulating a current provided to the light source. Modulation of the beam of light may advantageously improve a signal to noise ratio provided by the absorbance spectrometer via phase locked detection.

The light source may for example be an LED, laser diode or a lightbulb (incandescent bulb).

An absorbance spectrometer according to an embodiment of the disclosure may be used for sensing of medical samples (e.g. samples of fluid from a body of a person or animal). An absorbance spectrometer according to an embodiment of the disclosure may be used for environmental sensing, e.g. river water, pond water, sea water, or drinking water). An absorbance spectrometer according to an embodiment of the disclosure may be used for sampling in food or beverage production. An absorbance spectrometer according to an embodiment of the disclosure may be used for home measurements, such as water in a swimming pool.

Embodiments of the absorbance spectrometer may operate at a sufficiently low power that they may be powered using a battery or batteries (e.g. conventional batteries). Embodiments of the absorbance spectrometer may be sufficiently small that they can be carried by a user. Embodiments of the absorbance spectrometer may be sufficiently small that they can be worn by a user (e.g. on a wrist-strap).

Embodiments of the absorbance spectrometer may be disposable. Including the light source and the sensor. Alternatively, the sample housing of embodiments of the disclosure may be disposable. Where this is the case, the light source and sensor may be provided in a source and sensor housing which is arranged to receive and hold the sample housing. A clip or other engagement feature may be used to hold the sample housing to source and sensor housing, and then allow the sample housing to be removed for disposal. This may advantageously ensure that the light source and sensor are aligned with the sample housing.

In some instances some purification of separation steps may be performed on the sample before it can be used. Where this is the case the amount of usable sample may be between one fifth and one tenth of the sample which is obtained. Embodiments of the invention advantageously allow a smaller initial sample to be obtained in such circumstances.

The filters that are provided on the sensor may be configured to monitor for light at particular desired wavelengths (e.g. wavelengths which are known to be absorbed by molecules of interest). Although the depicted sensor comprises a 4×4 array of photodiodes, the sensor may have some other arrangement. The sensor may have a 4 or more photodiodes, 16 or more photodiodes, e.g. 64 or more photodiodes. In general, the sensor may have a plurality of photodiodes. The photodiodes may be configured to detect light at different wavelengths (e.g. by providing filters over the photodiodes).

In above described embodiments, light output from the light source is converted into a beam using an aperture. This is a low cost way of providing the beam of light. However, any other suitable beam forming element, such as a lens, may be used.

The optical absorbance spectrometer may comprise a processor and a memory. The memory may be configured to store output values received from the sensor. The processor may be configured to analyse the stored output values and to identify a dip in transmission which indicates the presence of a molecule of interest.

The term "sample holding volume" in the above is intended to mean a volume that is suitable for holding a sample in use.

A calibration of the optical absorbance spectrometer may be performed before absorbance spectrometry is performed. In one example, light may be emitted from the source and output values from the sensor stored, with air in the sample holding volume (i.e. without a sample being present). After this the sample may be introduced and the absorbance spectrometry measurement performed, taking into account the output values received when air was in the sample housing.

An alternative calibration may be used if the sample housing is removable from other parts of the optical absorbance spectrometer. A sample housing holding a reference solution such as a buffer solution may be used to obtain output values. That sample housing may then be removed and replaced with a sample housing holding a sample to be analysed. Again, the absorbance spectrometry measurement may take into account the output values received when reference solution was in the sample housing.

The sample housing may be referred to as a cuvette (although it has a volume which is smaller than a conventional cuvette.

The light source and the sensor may be provided as an integrated system. This may be achieved for example using CMOS back-end technology or using packaging technology to form a system on a semiconductor chip.

Features disclosed in connection with an embodiment of the invention may be used with other embodiments of the invention.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. An optical absorbance spectrometer comprising:
   a sample housing configured to hold a sample and comprising a light in-coupling region and a light out-coupling region, wherein the light in-coupling region and the light out-coupling region are located on a same external side of the sample housing such that both are accessible from a common direction external to the sample housing;
   a light source configured to emit broadband light into the light in-coupling region of the sample housing;
   one or more reflectors configured to reflect the light such that the light passes through a sample holding volume of the sample housing multiple times;
   a sensor arranged to receive the light from the light out-coupling region of the sample housing, after the reflections; wherein the sensor comprises a plurality of detectors configured to detect an intensity of the received light at multiple different wavelengths; and
   beam collecting optics arranged between the light out-coupling region and the sensor and comprising a prism with a curved reflecting surface and a lens, the beam collecting optics configured to receive a beam of light that leaves the sample holding volume, and to increase a cross-sectional area of the beam of light before the beam of light is incident upon the sensor,
   wherein the light source is configured to provide a beam of light, and the reflectors are configured to direct the beam of light through the sample holding volume multiple times.

2. The optical absorbance spectrometer of claim 1, wherein the sample holding volume is elongate and reflectors are provided on opposite sides of the sample housing.

3. The optical absorbance spectrometer of claim 2, wherein the light source and the reflectors are configured such that the beam of light crosses the sample holding volume multiple times as it propagates along the sample holding volume.

4. The optical absorbance spectrometer of claim 3, wherein at least one of the reflectors is concave.

5. The optical absorbance spectrometer of claim 3, wherein the reflectors are zigzags.

6. The optical absorbance spectrometer of claim 3, wherein the light source is configured such that the beam of light enters the sample holding volume at a non-normal angle through a wall of the sample holding volume.

7. The optical absorbance spectrometer of claim 1, wherein the light source comprises an aperture configured to convert diverging light from the light source into the beam of light.

8. The optical absorbance spectrometer of claim 1, wherein the beam collecting optics are integrally formed with the sample housing.

9. The optical absorbance spectrometer of claim 1, wherein a first area on a side of the sample housing is not reflective in order to allow the beam of light to enter the sample holding volume, and a second area on a side of the sample housing is not reflective in order to allow the beam of light to leave the sample holding volume.

10. The optical absorbance spectrometer of claim 1, wherein the sample holding volume is elongate and reflectors are provided at opposite ends of the sample housing.

11. The optical absorbance spectrometer of claim 10, wherein one of the reflectors is partially transmissive such that when the beam of light is incident upon the reflector a portion of the light beam passes through the reflector to the sensor.

12. The optical absorbance spectrometer of claim 10, wherein at least one of the reflectors is concave.

13. The optical absorbance spectrometer of claim 1, wherein the sample holding volume has a volume of less than 10 µl.

14. The optical absorbance spectrometer of claim 1, wherein detectors are photodiodes over which filters for different wavelengths are provided.

15. The optical absorbance spectrometer of claim 1, wherein the sample holding volume is spherical, and has a reflective surface.

16. The optical absorbance spectrometer of claim 1, wherein each curvature of the one or more reflectors provides for the light to be reflected inside of the sample housing along a same path multiple times.

17. The optical absorbance spectrometer of claim 16, wherein the curvature of the one or more reflectors provides for the light to travel between a center of a first reflector of the one or more reflectors and a center of a second reflector of the one or more reflectors.

* * * * *